(12) United States Patent
Ohtani et al.

(10) Patent No.: US 6,207,726 B1
(45) Date of Patent: Mar. 27, 2001

(54) PHOTOCURABLE PREPREG COMPOSITION AND PRODUCTION METHOD THEREOF

(75) Inventors: Kazuo Ohtani; Tomio Yamamoto, both of Saitama; Hidetake Sendai, Kanagawa; Shuichi Sugita, Tokyo; Hirotoshi Kamata, Kanagawa; Takeo Watanabe, Chiba, all of (JP)

(73) Assignees: Showa Denko Kabushiki Kaisha; Showa Highpolymer Co., Ltd., both of Tokyo (JP)

( * ) Notice: Subject to any disclaimer, the term of this patent is extended or adjusted under 35 U.S.C. 154(b) by 0 days.

(21) Appl. No.: 09/247,824

(22) Filed: Feb. 11, 1999

Related U.S. Application Data

(60) Provisional application No. 60/074,614, filed on Feb. 13, 1998.

(51) Int. Cl.[7] .................................. C08F 2/50; C08F 4/52; C08F 4/609; C08J 3/28; C08J 5/08

(52) U.S. Cl. .................................. 522/26; 522/28; 522/29; 522/37; 522/48; 522/53; 522/25; 522/27; 522/64; 522/106; 522/107; 522/100; 522/101; 522/102; 522/81; 526/90; 526/123.1; 526/124.2; 526/131; 526/134; 526/196; 526/204; 526/217

(58) Field of Search .................................. 522/14, 16, 18, 522/26, 28, 29, 37, 48, 53, 63, 64, 66, 107, 135, 144, 101, 100, 81, 102, 106, 25, 27; 526/90, 123.1, 124.2, 131, 134, 196, 204, 217

(56) References Cited

U.S. PATENT DOCUMENTS

| | | | |
|---|---|---|---|
| 4,425,287 | * | 1/1984 | Hesse et al. . |
| 5,153,100 | * | 10/1992 | Weed et al. ........................ 430/281.1 |
| 5,196,457 | * | 3/1993 | Wilkinson et al. .................. 522/103 |
| 5,514,728 | * | 5/1996 | Lamanna et al. ....................... 522/31 |
| 5,700,417 | * | 12/1997 | Fernyhough et al. ................ 264/477 |
| 5,702,991 | * | 12/1997 | Jacobs . |
| 5,952,152 | * | 9/1999 | Cunningham et al. ........... 430/281.1 |

* cited by examiner

*Primary Examiner*—Susan W. Berman
(74) *Attorney, Agent, or Firm*—Sughrue, Mion, Zinn, Macpeak & Seas, PLLC

(57) ABSTRACT

A photocurable prepreg composition which is characterized by easy control of a B stage state of a thermosetting resin such as an unsaturated polyester resin or an epoxy acrylate resin, excellent storage stability, and remarkable curability after being shaped; as well as a production method therefor. A photocurable prepreg composition which contains an unsaturated polyester resin and/or an epoxy acrylate resin; at least two photopolymerization initiators with photosensitivity in different wavelength ranges; and an inorganic or an organic fiber-reinforcing material and/or filler, and which composition is treated with light of a specific wavelength such that at least one photopolymerization initiator and radical-polymerizable unsaturated groups remain partially in said resin; a production method therefor; and formed articles produced therefrom.

7 Claims, No Drawings

PHOTOCURABLE PREPREG COMPOSITION AND PRODUCTION METHOD THEREOF

CROSS REFERENCE TO RELATED APPLICATIONS

This application is an application filed under 35 U.S.C. §111(a) claiming benefit pursuant to 35 U.S.C. §119(e)(i) of the filing date of Provisional Application 60/074,614 filed Feb. 13, 1998 pursuant to 35 U.S.C. §111(b).

FIELD OF THE INVENTION

The present invention relates to a photocurable prepreg composition which comprises a resin, and a fiber-reinforcing material and/or a filler and which assumes various forms such as a roll, pipe, or tube, as well as to a production method therefor.

BACKGROUND OF THE INVENTION

With regard to fiber-reinforced plastics (hereinafter referred to as FRP) which are used as materials that require strength such as molded products and structural materials for buildings, thermosetting resins such as epoxy resins, unsaturated polyester resins, and vinyl ester resins (also called epoxy acrylate resins) are used in combination with inorganic or organic reinforcing materials such as glass fiber or carbon fiber.

Conventionally, prepreg sheets employing a thermosetting resin have been produced by impregnating a fibrous substrate such as glass fiber or carbon fiber with a thermosetting resin containing a non-reactive solvent as a diluent, and simultaneously drying to remove the non-reactive solvent and B-staging the thermosetting resin (thickening) by, e.g., heating; or by impregnating a fibrous substrate such as glass fiber or carbon fiber with a solvent-free thermosetting resin and B-staging by, e.g., heating. Among these prepregs, those of photocurable types have been used particularly for the production of large-size prepregs which cannot be heated or are difficult to heat homogeneously, or for the production of prepregs which are used outdoors. The photocurable-type prepregs have thus become of interest in that they have high curing speed and may simply be applied to buildings without use of any heat source.

There is known a method for B-staging a thermosetting resin in order to produce prepregs wherein a starting thermosetting resin is partially cured to attain an appropriate B stage at which the polymerization is terminated. However, a stable B-stage is difficult to maintain during typical production steps. In particular, when a resin containing a compound having a radical-polymerizable unsaturated group such as an unsaturated polyester resin or vinyl ester resin is B-staged by prepolymerizing the radical-polymerizable unsaturated groups, a stable B stage is difficult to maintain.

In this connection, there is known a method for thickening a vinyl ester resin wherein a hydroxyl group or a carboxyl group pendant from a hydroxyl group in the vinyl ester resin is caused to react with a diisocyanate to attain a B stage. However, using the method for providing a stable B stage is difficult, since the B-staging reaction is largely susceptible to a microamounts of water, active groups, etc.

With regard to typical methods for thickening a unsaturated polyester resin, there are methods involving addition of magnesium oxide which are disclosed in JP-A-62-73914, JP-A-62-73915, JP-A-62-73916, and JP-A-62-73917 (The term "JP-A" as used herein means an "unexamined published Japanese patent application.").

However, the above-described methods for thickening that employ a diisocyanate and magnesium oxide involve a problem that a reactive diluent such as styrene monomer present in a resin does not participate in thickening reaction of a vinyl ester resin or unsaturated polyester resin, to thereby result in separation and sagging of the reactive diluent during storage of the prepreg.

JP-A-6-287524 discloses a method in which a gelling agent is added to a raw material of a prepreg to make the material a disintegrable gel. In the method, however, controlling transition of a gel state to a B stage is still difficult. Thus, problems related to B-staging an unsaturated polyester resin or vinyl ester resin remain unsolved.

SUMMARY OF THE INVENTION

An object of the present invention is to provide a photocurable prepreg composition with easy control of a B stage state of a thermosetting resin such as an unsaturated polyester resin or a vinyl ester resin and realization of a stable B stage state; which provides a prepreg composition having excellent storage stability; and which has a wide range of usability, i.e., molded products having good curability and available in a variety of forms such as a sheet, roll, tube, or pipe, structural materials for buildings, or mending materials thereof.

Another object of the present invention is to provide a production method therefor.

The above objects of the present invention have been accomplished by provision of the following:

(1) a photocurable prepreg composition which comprises an unsaturated polyester resin and/or a vinyl ester resin; at least two photopolymerization initiators with photosensitivity in different wavelength ranges; and an inorganic or an organic fiber-reinforcing material and/or filler, and which composition is treated with light of a specific wavelength such that at least one photopolymerization initiator and radical-polymerizable unsaturated groups remain partially in said resin;

(2) a photocurable prepreg composition according to (1), wherein the photopolymerization initiators comprise a combination of a photopolymerization initiator with photosensitivity in near infrared range and a photopolymerization initiator with photosensitivity in visible and/or ultraviolet range;

(3) a photocurable prepreg composition according to (1), wherein the photopolymerization initiators comprise a combination of a photopolymerization initiator having photosensitivity in a visible range of wavelengths of 500 nm or more and a photopolymerization initiator with photosensitivity in a visible range of wavelengths of less than 500 nm and/or in ultraviolet range;

(4) a photocurable prepreg composition according to (2) or (3), wherein the photopolymerization initiator with photosensitivity in a visible range of wavelengths of 500 nm or more or in near infrared range comprises a combination of a cationic dye represented by formula (1):

(wherein $D^+$ represents a dye cation which is photosensitive in the visible or near infrared range and which is derived from methine, polymethine, cyanine, xanthene, oxazine, thiazine, arylmethane, and pyrylium; and $A^-$ represents an anion) and an organo borate represented by formula (2):

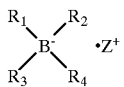

(2)

wherein $Z^+$ represents a cation; each of $R_1$, $R_2$, $R_3$, and $R_4$ represents an alkyl group, an aryl group, an acyl group, an aralkyl group, an alkenyl group, an alkynyl group, a silyl group, a heterocyclic group, or a halogen atom;

(5) a photocurable prepreg composition according to (4), wherein a cation moiety ($D^+$) of the photopolymerization initiator represented by formula (1) and with photosensitivity in a visible range of wavelengths of 500 nm or more or in the near infrared range is a cyanine or a triarylmethane cationic dye;

(6) a photocurable prepreg composition according to any of (1) to (5), wherein one of the photopolymerization initiators with photosensitivity in the visible range and/or ultraviolet range comprises an acylphosphine oxide compound or a combination of a hexaarylbisimidazole compound and a hydrogen-donating compound;

(7) a production method for a photocurable prepreg composition comprising a step of prepolymerization by irradiating a composition which comprises an unsaturated polyester resin and/or a vinyl ester resin; at least two photopolymerization initiators with photosensitivity in different wavelength ranges; and an inorganic or an organic fiber-reinforcing material and/or filler, with light of a wavelength in a range where at least one of the photopolymerization initiators present in the composition has photosensitivity and where at least one of the other photopolymerization initiators is without photosensitivity;

(8) a production method for a photocurable prepreg composition according to (7), which comprises a step of prepolymerization by irradiating a composition which comprises an unsaturated polyester resin and/or a vinyl ester resin; at least two photopolymerization initiators with photosensitivity in different wavelength ranges; and an inorganic or an organic fiber-reinforcing material and/or filler, with visible light of a wavelength of 500 nm or more or with near infrared light;

(9) a curing method for a photocurable prepreg composition, wherein a photocurable prepreg composition according to (1) is installed or molded and irradiated with light having wavelength of photosensitivity of a photopolymerization initiator present in the prepreg composition; and

(10) a cured product of a photocurable prepreg composition, which is obtained by installing or molding, and irradiating a photocurable prepreg composition according to (1) with light having a wavelength of photosensitivity of a photopolymerization initiator present in the prepreg composition.

DETAILED DESCRIPTION OF THE INVENTION

Among the polymerizable compounds which are used in the present invention, the unsaturated polyesters may be produced through a known method. Specifically, the polyesters are produced through polycondensation between a polybasic acid or an anhydride thereof, which serves as an acid component, and a polyhydric alcohol, which serves as an alcohol component. Examples of the acid include saturated polybasic acids having no polymerizable unsaturated bond such as phthalic anhydride, isophthalic acid, terephthalic acid, tetrahydrophthalic acid, or adipic acid; and unsaturated polybasic acids having an active unsaturated bond such as fumaric acid, maleic acid, maleic anhydride, or itaconic acid. Examples of the alcohol include ethylene glycol, propylene glycol, diethylene glycol, dipropylene glycol, 1,2-butanediol, 1,4-butanediol, 1,5-pentanediol, 1,6-hexanediol, 2-methyl-1,3-propanediol, 2,2-dimethyl-1,3-propanediol, cyclohexane-1,4-dimethanol, bisphenol A-ethylene oxide adducts, and bisphenol A-propylene oxide adducts.

The vinyl esters may be produced by a known method. Specific examples include epoxy (meth)acrylates which are obtained by adding acrylic acid or methacrylic acid to an epoxy resin; and saturated or unsaturated polyester (meth)acrylates which are obtained by reacting a carboxyl-terminated saturated or unsaturated polyester, wherein the polyester is obtained from a saturated dicarboxylic acid and/or an unsaturated dicarboxylic acid and a polyhydric alcohol, with an epoxy compound having an α,β-unsaturated carboxylic acid ester group.

Examples of the epoxy resins serving as a source material to produce vinyl esters include bisphenol A diglycidyl ether, its high-molecular weight homologues, and novolak polyglycidyl ethers.

Examples of the saturated dicarboxylic acid used for the carboxyl-terminated saturated or unsaturated polyester include dicarboxylic acids having no active unsaturated group, such as phthalic acid, isophthalic acid, terephthalic acid, tetrahydrophthalic acid, adipic acid, or sebacic acid. Examples of the unsaturated dicarboxylic acid thereof include dicarboxylic acids having an active unsaturated group such as fumaric acid, maleic acid, maleic anhydride, or itaconic acid. Examples of the polyhydric alcohol component thereof include ethylene glycol, propylene glycol, diethylene glycol, dipropylene glycol, 1,2-butanediol, 1,4-butanediol, 1,5-pentanediol, 1,6hexanediol, 2-methyl-1,3-propanediol, 2,2-dimethyl-1,3-propanediol, cyclohexane-1,4-dimethanol, bisphenol A-ethylene oxide adducts, and bisphenol A-propylene oxide adducts.

Examples of the epoxy compound having an α,β-unsaturated carboxylic acid ester group include glycidyl methacrylate.

The unsaturated polyesters or vinyl esters constituting the polymerizable compounds preferably have a comparatively high unsaturation degree, and those having an unsaturated group equivalent (molecular weight per unsaturated group) of about 100–800 are preferably used. When the equivalent is less than 100, synthesis of the ester is impossible; whereas when it is in excess of 800, the curing reaction is slow due to drastically low concentration of a reactive group, or a cured product having high hardness cannot be obtained.

The unsaturated polyester resins or vinyl ester resins which are used in the present invention comprise the above-described unsaturated polyesters or vinyl esters blended with a monomer having a radical-polymerizable unsaturated group, such as a styrene monomer or methyl methacrylate.

During the production of photocurable prepreg compositions, the monomer having a radical-polymerizable unsaturated group added to the polymerizable compounds of the present invention is important for enhancing kneadability of the polymerizable compounds with a fiber reinforcing material and a filler and impregnation performance, as well as for improving properties of cured products of the compositions, such as hardness, strength, chemical resistance, or water resistance. The monomer is generally used in an amount of 10–250 parts by weight, preferably 20–100 parts by weight, based on 100 parts of the vinyl ester or unsaturated polyester. When the amount is less than 10 parts by weight, the viscosity of the polymerizable compounds increases to provide difficulty in impregnating a fiber reinforcing material or a filler therewith and poor moldability, whereas when the amount is in excess of 250 parts by weight, a cured product having high hardness cannot be obtained; such a product has insufficient heat resistance and the resins are proven to be undesirable FRP materials.

A styrene monomer is preferably used as a monomer having a radical-polymerizable unsaturated group. The styrene monomer may be partially or completely replaced with a radical-polymerizable monomer such as chlorostyrene, methyl (meth)acrylate, 2-hydroxy-3-phenoxypropyl (meth) acrylate, or ethylene glycol di(meth)acrylate.

The fiber reinforcing materials which may be used in the present invention can be organic and/or inorganic. A variety of known fibers, such as glass fiber, carbon fiber, aramid fiber, polyethylene terephthalate fiber, or vinylon fiber may be employed. Needless to say, these fibers may be used in combination. The amount thereof is generally 5–300 parts by weight, preferably 10–100 parts by weight, based on 100 parts of the polymerizable compounds.

The filler of the present invention may be used with or without a fiber reinforcing material. The filler which may be used is an inorganic filler, an organic filler, or a polymer. Examples of the inorganic filler include known ones such as calcium carbonate, talc, clay, glass powder, glass beads, silica, aluminum hydroxide, barium sulfate, or titanium oxide, and these inorganic fillers may be used in combination. The amount of the inorganic filler is generally 0–300 parts by weight, preferably 0–200 parts by weight, based on 100 parts by weight of the polymerizable compounds. If the inorganic filler is in excess of 300 parts by weight, the viscosity of the polymerizable compounds increases to result in poor impregnation properties, and there arise such problems that foam tends to persist in the resins and the fluidity of a prepreg becomes poor during molding to provide difficulty in tightly adhering to a mold. These problems result in a deterioration of quality.

Examples of organic fillers and polymers which may be added to the compositions of the present invention include those which may also serve as low-shrinkage materials, such as known polystyrene, polyvinyl acetate, polymethyl methacrylate, polyethylene, polyvinylidene chloride microballoon, and polyacrylonitrile microballoon. In order to serve as low-shrinkage materials, the organic fillers and polymers are generally used in amounts of 0–40 parts by weight, preferably 0–30 parts by weight, based on 100 parts by weight of polymerizable compounds. Amounts in excess of 40 parts by weight result in degraded moldability due to excessively high viscosity, as well as decreases in smoothness of the surface of the cured product and in heat resistance.

In the present invention, a pigment may further be used. No particular limitation is imposed on the type of the pigment, and organic and inorganic pigments may be used. Amounts of the pigments are no more than 20 parts by weight, preferably no more than 10 parts by weight, based on 100 parts by weight of the polymerizable compounds.

Examples of a preferable photopolymerization initiator with photosensitivity in a visible range of wavelength of 500 nm or more or near infrared light range which is used in the present invention include a combination of a cationic dye represented by formula (1):

$$D^+ \bullet A^- \quad (1)$$

wherein $D^+$ represents a dye cation with photosensitivity in a visible range of wavelength of 500 nm or more or near infrared light range and which is derived from methine, polymethine, cyanine, xanthene, oxazine, thiazine, arylmethane, and pyrylium, and $A^-$ represents an anion and an organo borate represented by formula (2):

$$(2)$$

wherein $Z^+$ represents a cation; each of $R_1$, $R_2$, $R_3$, and $R_4$ represents an alkyl group, an aryl group, an acyl group, an aralkyl group, an alkenyl group, an alkynyl group, a silyl group, a heterocyclic group, or a halogen atom.

Examples of the cation $Z^+$ in formula (2) include those without photosensitivity in a visible light or near infrared light range such as a quaternary ammonium cation; a quaternary pyridinium cation; a quaternary quinolinium cation; a diazonium cation; a tetrazolium cation; a sulfonium cation; an oxosulfonium cation; metal cations such as a cation of sodium, potassium, lithium, magnesium, or calcium; organic compounds having a cationic charge on an oxygen atom such as a flavynium or pyranium salt; carbocations such as tropylium or cyclopropylium; halogenium cations such as iodonium; and cations of a compound containing metals such as arsenic, cobalt, palladium, chromium, titanium, tin, or antimony.

In formula (2), the alkyl group, the aryl group, the acyl group, the aralkyl group, the alkenyl group, the alkynyl group, the silyl group and the heterocyclic group represented by $R_1$, $R_2$, $R_3$ or $R_4$ each may have any substituent. Specific examples of substituents include a methyl group, an ethyl group, a n-propyl group, an isopropyl group, a n-butyl group, a sec-butyl group, an isobutyl group, a tert-butyl group, a n-octyl group, a n-dodecyl group, a cyclopentyl group, a cyclohexyl group, a phenyl group, a tolyl group, a xylyl group, an anisyl group, a biphenyl group, a naphthyl group, a benzyl group, a phenethyl group, a diphenylmethyl group, a methoxy group, an ethoxy group, a n-propoxy group, an isopropoxy group, a n-butoxy group, a sec-butoxy group, a tert-butoxy group, a methylenedioxy group, an ethylenedioxy group, a phenoxy group, a naphthoxy group, a benzyloxy group, a methylthio group, a phenylthio group, a 2-furyl group, a 2-thienyl group, a 2-pyridyl group and a fluoro group, however, the present invention is by no means limited to these examples.

Specific examples of the quaternary organo borate anion represented by formula (2) include n-butyltriphenylborate, n-octyltriphenylborate, n-dodecyltriphenylborate, sec-butyltriphenylborate, tert-butyltriphenylborate, benzyltriphenylborate, n-butyltri(p-anisyl)borate, n-octyltri(p-anisyl)borate, n-dodecyltri(p-anisyl)borate, n-butyltri(p-tolyl)borate, n-butyltri(o-tolyl)borate, n-butyltri(4-tert-butylhenyl)borate, n-butyltri(4-fluoro-2-methylphenyl)borate, n-butyltri(4-fluorophenyl)borate, n-butyltrinaphthylborate, triphenylsilyltriphenylborate, trimethylsilyltriphenylborate, tetra-n-butylborate, di-n-butyldiphenylborate and tetrabenzylborate. Of these, compounds having a structure such that $R_1$ is an alkyl group and $R_2$, $R_3$ and $R_4$ each is an aryl group are well balanced between stability and curability and suitable for the photocurable prepreg composition of the present invention.

The dye irradiated with light of a wavelength in the photosensitizable range is excited by use of a combination of the organo borate and a dye having a wavelength for photosensitization in the visible or near infrared range. Subsequently, electron transfer between the dye and the organo borate decolors the dye and induces generation of radicals, which initiate a polymerization of coexisting polymerizable unsaturated compounds. Differing from the conventionally known dye-sensitized polymerization, the photopolymerization of the present invention has an advantage in that light absorption of a dye itself does not interfere with the transparency of irradiation light and prepregs or cured products thereof are not colored with the dye due to irreversible decoloring reaction of the dye.

Therefore, as mentioned below, the counter ion of the cationic dye with no photosensitization at a wavelength in the visible or near infrared range may be a organo borate anion; in contrast, the cation moiety serving as a counter ion of the organo borate must be a colorless cation without any photosensitization at a wavelength in the visible range.

Examples of the above-described combination of the cationic dye and the organic boron compound include combinations described in detail in JP-A-3-111402, JP-A-3-119003, JP-A-4-80204, JP-A-4-146905, JP-A4-261405, JP-A-4-261406, JP-A-5-194619, JP-A-5-59110, etc. Specific examples of the cationic dye [$D^+$] are shown in Table 1 and Table 2. Among these cationic dyes, cyanine compound cationic dyes and triarylmethane compound dyes are preferably used. Generally, electron transfer easily occurs from organo borate compounds to cyanine compound cationic dyes, and thus, the cationic dyes easily cause a reaction of the present invention; whereas triarylmethane compound dyes are preferred in that coloring of prepregs is remarkably suppressed after passage of time.

TABLE 1

| No. | Structure | $\gamma_{max}$ (TMPT) |
|---|---|---|
| 1 | 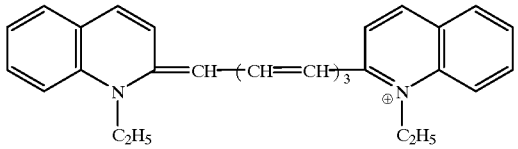 | 820 nm |
| 2 | 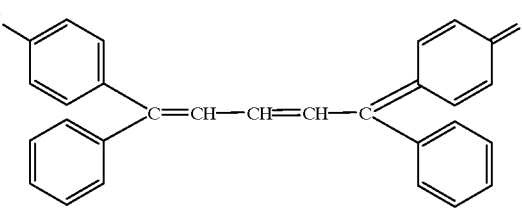 | 830 nm |
| 3 | 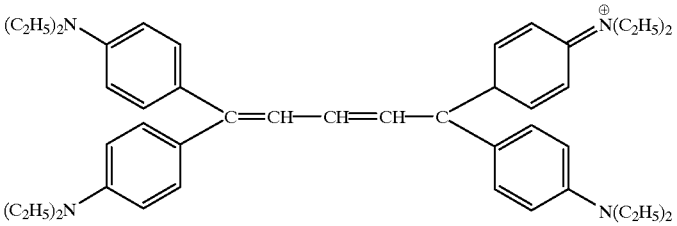 | 822 nm |
| 4 | 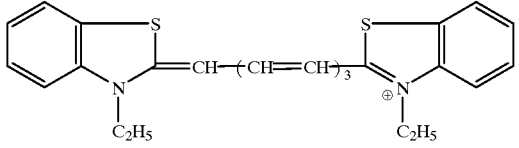 | 768 nm |
| 5 | 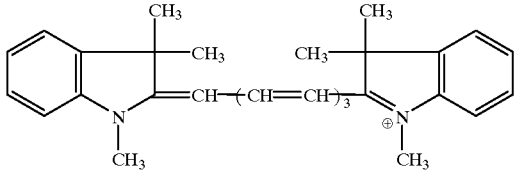 | 748 nm |

TABLE 1-continued
| No. | Structure | $\gamma_{max}$ (TMPT) |
|---|---|---|
| 6 | 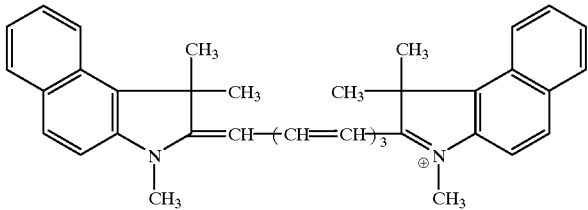 | 785 nm |
| 7 | 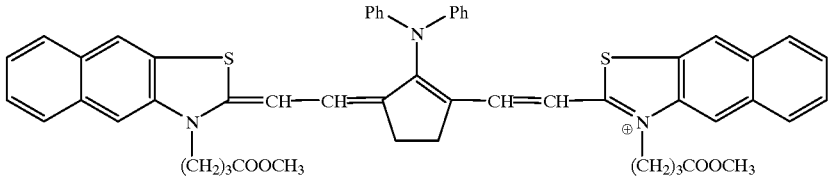 | 828 nm |
| 8 | 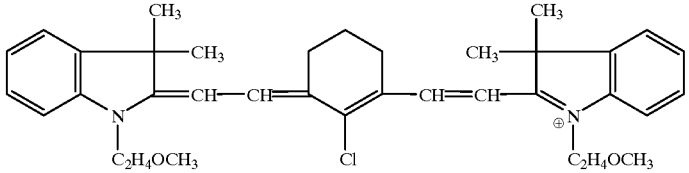 | 787 nm |
| 9 | 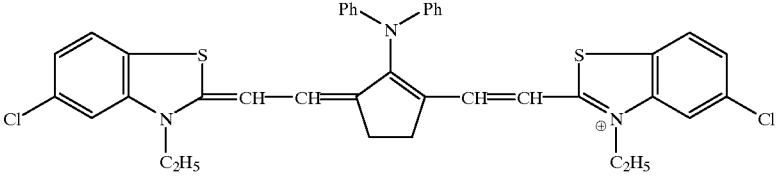 | 819 nm |
| 10 | 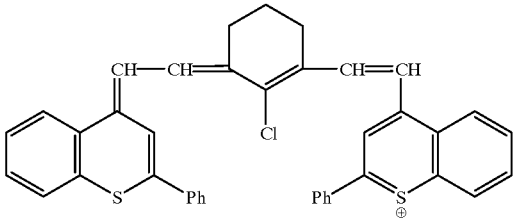 | 1080 nm |
γ represents the maximum absorption wavelength. Ph represents a phenyl group. TMPT represents trimethylolpropane trimethacrylate.
TABLE 2
| No. | Chemical Structure | Maximum Absorption Wavelength (Solvent) |
|---|---|---|
| 1 | 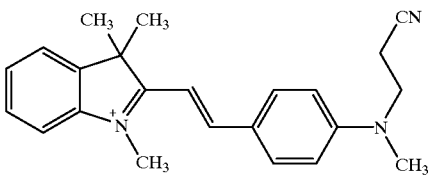 | 522 nm (acetonitrile) |

TABLE 2-continued

| No. | Chemical Structure | Maximum Absorption Wavelength (Solvent) |
|---|---|---|
| 2 | | 528 nm (acetonitrile) |
| 3 | | 549 nm (acetonitrile) |
| 4 | | 559 nm (acetonitrile) |
| 5 | | 584 nm (acetonitrile) |
| 6 | | 589 nm (acetonitrile) |

TABLE 2-continued

| No. | Chemical Structure | Maximum Absorption Wavelength (Solvent) |
|---|---|---|
| 7 | 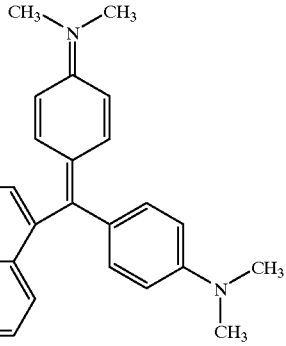 | 613 nm (acetonitrile) |

Examples of A⁻, which is a counter anion of the cationic dye represented by formula (1), include a p-toluenesulfonate ion, organic carboxylate ions, a perchlorate ion, and halide ions. Particularly preferred are tetracoordinated organo borate anions represented by formula (3):

(3)

wherein each of $R_5$, $R_6$, $R_7$, and $R_8$ represents an alkyl group, an aryl group, an acyl group, an aralkyl group, an alkenyl group, an alkynyl group, a silyl group, a heterocyclic group, or a halogen atom.

In formula (3), the alkyl group, the aryl group, the acyl group, the aralkyl group, the alkenyl group, the alkynyl group, the silyl group and the heterocyclic group represented by $R_5$, $R_6$, $R_7$ or $R_8$ each may have any substituent. Specific examples of the substituent include a methyl group, an ethyl group, a n-propyl group, an isopropyl group, a n-butyl group, a sec-butyl group, an isobutyl group, a tert-butyl group, a n-octyl group, a n-dodecyl group, a cyclopentyl group, a cyclohexyl group, a phenyl group, a tolyl group, a xylyl group, an anisyl group, a biphenyl group, a naphthyl group, a benzyl group, a phenethyl group, a diphenylmethyl group, a methoxy group, an ethoxy group, a n-propoxy group, an isopropoxy group, a n-butoxy group, a sec-butoxy group, a t-butoxy group, a methylenedioxy group, an ethylenedioxy group, a phenoxy group, a naphthoxy group, a benzyloxy group, a methylthio group, a phenylthio group, a 2-furyl group, a 2-thienyl group, a 2-pyridyl group and a fluoro group, however, the present invention is by no means limited these examples.

The organo borate and near infrared light- or visible light-absorbing cationic dye compound are present in a compositional ratio by weight of 1/5–1/0.01, preferably 1/1–110.1. Generally, the organo borate is preferably used in an amount greater than that of the cationic dye, in view of decoloration reaction of the dye and efficiency of radical generation.

Examples of known visible light-polymerization initiators with photosensitivity in a visible light range include a combination of a hexaarylbiimidazole compound and a hydrogen-donating compound; single visible light-polymerization initiators such as camphorquinone, benzil, trimethylbenzoyldiphenylphosphine oxide, methylthioxanthone, or bis(cyclopentadienyl)titanium-di(pentafluorophenyl), which are described in Yamaoka et al., "Hyomen," 27(7), 548 (1989), Sato et al., "Resumes of the Third Polymer Material Forum," IBPI8 (1994), etc.; and known combination initiator systems such as organic peroxide/dye systems; diphenyliodonium salt/dye systems; biimidazole/keto compound systems; thiopyrylium salt/mercaptobenzothiazole systems; metal arene/cyanine dye systems; and a hexaarylbiimidazole/radical-generator system which is described in JP-B-45-37377 (The term "JP-B" as used herein means an "examined Japanese patent publication".).

There may also be used known ultraviolet light-polymerization initiators such as acetophenones, benzylketals, and (bis)acylphosphine oxides having photosensitivity in the ultraviolet range. Since the present invention is directed to photocuring of a material having low transparency to short-wavelength ultraviolet light by use of light of a long wavelength that has conventionally been difficult, there are preferably used ultraviolet light-polymerization initiators such as (bis)acylphosphine oxides having photosensitivity at a comparatively long wavelength, preferably in a wavelength range at 300 nm or more.

These polymerization initiators, i.e., near infrared light-polymerization initiators, visible light-polymerization initiators, and ultraviolet-polymerization initiators are used in an amount of typically 0.01–20 parts by weight based on 100 parts of a photopolymerizable compound, preferably 0.05–15 parts by weight. When the amount is less than 0.01 part by weight, polymerization tends to be insufficient; whereas when it is in excess of 20 parts by weight, cured products have poor strength and durability.

In the case of the combined use of a visible light-polymerization initiator with photosensitivity in near ultraviolet range or a range at 500 mm or more for production of the prepreg of the present invention and a visible light-polymerization initiator and/or an ultraviolet light-polymerization initiator for photocuring the prepreg, the composition ratio of the two is generally 0.1/5 to 5/0.1, preferably 0.5/5 to 5/0.5, on a weight basis. If the ratio is less than 0.1/5, a thickening reaction hardly proceed to a B-stage when the photocurable composition of the present invention is irradiated with light of a wavelength of 500 nm or more, and excessively proceeds to a B-stage when irradiated with light of a wavelength of less than 500 nm. When the ratio is greater than 5/0.1, features contrary to the above occur, which are not preferred.

In the present invention, the expressions "near infrared light," "visible light," and "ultraviolet light" refer to light of a wavelength of 780–1200 nm, light of a wavelength of 380–780 nm, and light of a wavelength of less than 380 nm, respectively.

The light source which is used in the production of a prepreg made of the B-staged photopolymerizable compounds should have a spectral distribution within the photosensitive wavelength range of the photopolymerization initiator. For example, a near infrared lamp, a sodium lamp, a halogen lamp, a fluorescent lamp, an incadescent lamp, a solar lamp, a metal halide lamp, a high-pressure mercury lamp, or an ultrahigh-pressure mercury lamp may be used. These lamps or light sources of broader wavelengths may be combined with a wavelength cutting filter so that light having a suitable wavelength for B-staging may be selected for irradiation.

When the photocurable prepreg composition of the present invention is cured by use of natural light or sunlight, B-staging is preferably performed by irradiation with near infrared light or visible light of a wavelength of 500 nm or more by use of a wavelength cutting filter during production of prepregs.

The irradiation time from a lamp required for B-staging the photopolymerizable compounds is not specifically determined, since light sources have different effective wavelength ranges and output powers, and the irradiation distance and the thickness of the composition product may vary. However, an irradiation time of 0.01 hour or more, preferably 0.05 hours or more, suffices.

The production method of the photocurable prepreg composition of the present invention is easily applied to conventional production methods of a prepreg composition by use of unsaturated polyester resins or vinyl ester resins. The prepreg composition may take an arbitrary form such as sheet, roll, pipe, and tube in accordance with the desired use. In particular, the prepreg composition is preferably formed into molded sheets, or used for mending inner surfaces of molded tubes such as drainpipes.

The thus-produced photocurable prepreg composition can be rapidly and fully cured through irradiation with light of a wavelength corresponding to that of the photosensitivity of the remaining photopolymerizable initiator.

EXAMPLES

The present invention will next be described in more detail by way of examples and comparative examples, wherein "parts" are on a weight basis. The present invention is in no way limited only to the examples given herein.

Trademarked vinyl ester resins used in Examples are as follows:

Ripoxy R-802: Bisphenol A type epoxy (meth)acrylates
Ripoxy R-808: Bisphenol A type epoxy (meth)acrylates
Ripoxy H-630: Novolak type epoxy (meth)acrylates.

Example 1

To 100 parts of a vinyl ester resin (trade name: Ripoxy R-802, product of Showa Highpolymer Co., Ltd.), there were added 1,1,5,5-tetrakis(p-diethylaminophenyl)-2,4-pentadienyl triphenyl-n-butylborate (product of Showa Denko K.K., abbreviated as IRB hereinafter, a near infrared light absorbable cyanine cationic dye) (0.03 parts), tetra-n-butylammonium triphenyl-n-butylborate (product of Showa Denko K.K., abbreviated as P3B hereinafter, an organo borate) (0.15 parts), 2,2'-bis(o-chlorophenyl)-4,5,4',5'-tetraphenyl-1,2'-bisimidazole (product of Wako Pure Chemical Industries, Ltd., abbreviated as Blm) (0.3 parts), and 2-mercaptobenzothiazole (product of Wako Pure Chemical Industries, Ltd., abbreviated as MBT) (1.0 part) [a combination of Blm/MBT=photopolymerization initiators with photosensitivity in the visible light range]. One ply of a glass fiber #450 chopped strand mat (10 cm×10 cm, product of Asahi Fiberglass K.K.) was impregnated with the thus-obtained photocurable resin composition so that the mat came to have a glass content of 30 wt %.

The resultant product was coated with Mylar film and irradiated with light from a 1 KW AL-spotlight (ALF-10) (product of RDS Corp.), which is a light source featuring a wavelength range of 390 to 1200 nm, from a distance of 50 cm with combined use of a filter for cutting wavelength 600 nm or less, SC60 (Fuji Photo Film Co., Ltd.). Five-minute irradiation successfully yielded a B-staged product. The product remained B-staged after another 10-minute irradiation. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated. The laminate was completely cured after 10 minutes when allowed to stand under sunlight and after one hour when allowed to stand in the shade.

Barcol hardness measurement was performed on a cured product which had been allowed to stand for one hour under sunlight and a cured product which had been allowed to stand for six hours in the shade, by use of a Barcol hardness tester (Type 934-1) according to JIS K-6911. The flexural strengths of the products were also measured. The results are shown in Table 3.

Example 2

To 100 parts of vinyl ester resin (trade name: Ripoxy H-630, product of Showa Highpolymer Co., Ltd.), there were added IRB (0.03 parts), P3B (0.15 parts), and Irgacure 1700 (ultraviolet-visible light initiator, product of Ciba Geigy Co. Ltd.) (1.0 part). One ply of a glass fiber #450 chopped strand mat (10cm×10 cm) used in Example 1 was impregnated with the thus-obtained photocurable resin composition so that the mat came to have a glass content of 30 wt %.

The composite material composition was coated with Mylar film and irradiated with light from a 1 KW AL-spotlight (ALF-10), which is a light source featuring a wavelength range of 390 to 1200 nm, from a distance of 50 cm with combined use of a filter for cutting wavelength 600 nm or less, SC60. Five-minute irradiation successfully yielded a B-staged product. The product remained B-staged after another 10-minute irradiation. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated. The laminate was completely cured after 7 minutes when allowed to stand under sunlight and after 40 minutes when allowed to stand in the shade.

Barcol hardness measurement was performed on a cured product which had been allowed to stand for one hour under sunlight and a cured product which had been allowed to stand for six hours in the shade, by use of a Barcol hardness tester (Type 934-1) according to JIS K-6911. The flexural strengths of the product were also measured. The results are shown in Table 3.

Example 3

To 100 parts of vinyl ester resin (trade name: Ripoxy R-802, product of Showa Highpolymer Co., Ltd.), there were added a visible light-absorbing dye shown in Table 2-4 (counter ion; chloride anion) (0.02 parts), P3B (0.15 parts), and Irgacure 1800 (ultraviolet-visible light initiator, product of Ciba Geigy Co. Ltd.) (1.0 part). As in the case of Example 1, one ply of a glass fiber #450 chopped strand mat (10 cm×10 cm, product of Asahi Fiberglass K.K.) was impregnated with the thus-obtained photocurable resin composition so that the mat came to have a glass content of 30 wt %.

The composite material composition was coated with Mylar film and irradiated with light from a 1 KW AL-spotlight (ALF-10) (product of RDS Corp.), which is a light source featuring a wavelength range of 390 to 1200 nm, from a distance of 50 cm with combined use of a filter for cutting wavelength 500 nm or less, SC50 (Fuji Photo Film Co., Ltd.). Five-minute irradiation successfully yielded a B-staged product. The product remained B-staged after another 10-minute irradiation. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated. The laminate was completely cured after 7 minutes when allowed to stand under sunlight and after 40 minutes when allowed to stand in the shade.

Barcol hardness measurement was performed on a cured product which had been allowed to stand for one hour under sunlight and a cured product which had been allowed to stand for six hours in the shade, by use of a Barcol hardness tester (Type 934-1) according to JIS K6911. The flexural strength of the product was also measured. The results are shown in Table 3.

Example 4

To 100 parts of vinyl ester resin (trade name: Ripoxy H630, product of Showa Highpolymer Co., Ltd.), there were added a visible light-absorbing triarylmethane dye shown in Table 2-6 (counter ion; tetraphenylborate anion) (0.02 parts), tetra-n-butylammonium tri(p-t-butylphenyl)-n-butylborate (product of Showa Denko K.K., abbreviated as BP3B hereinafter, an organo borate) (0.20 parts), and Irgacure 1800 (product of Ciba Geigy Co. Ltd.) (1.0 part). As in the case of Example 1, one ply of a glass fiber #450 chopped strand mat (10 cm×10 cm) was impregnated with the thus-obtained photocurable resin composition so that the mat came to have a glass content of 30 wt %.

The composite material composition was coated with Mylar film and irradiated with light from a 1 KW AL-spotlight (ALF-10), which is a light source featuring a wavelength range of 390 to 1200 nm, from a distance of 50 cm with combined use of a filter for cutting wavelength 500 nm or less, SC50. Five-minute irradiation successfully yielded a B-staged product. The product remained B-staged after another 10-minute irradiation. The five-minute-irradiated B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated. The laminate was completely cured after 7 minutes when allowed to stand under sunlight and after 40 minutes when allowed to stand in the shade.

Barcol hardness measurement was performed on a cured product which had been allowed to stand for one hour under sunlight and a cured product which had been allowed to stand for six hours in the shade, by use of a Barcol hardness tester (Type 934-1) according to JIS K-6911. The flexural strength of the product was also measured. The results are shown in Table 3.

Example 5

To 100 parts of vinyl ester resin (trade name: Ripoxy R-802, product of Showa Highpolymer Co., Ltd.), there were added a visible light-absorbing triarylmethane dye shown in Table 2-7 (counter ion; tetraphenylborate anion) (0.02 parts), BP3B (0.20 parts), Blm (0.3 parts), and MBT (1.0 part). As in the case of Example 1, one ply of a glass fiber #450 chopped strand mat (10 cm×10 cm) was impregnated with the thus-obtained photocurable resin composition so that the mat came to have a glass content of 30 wt %.

The composite material composition was coated with Mylar film and irradiated with light from a 1 KW AL-spotlight (ALF-10), which is a light source featuring a wavelength range of 390 to 1200 nm, from a distance of 50 cm with combined use of a filter for cutting wavelength 500 nm or less, SC50. Five-minute irradiation successfully yielded a B-staged product. The product remained B-staged after another 10-minute irradiation. The five-minute-irradiated B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated. The laminate was completely cured after 10 minutes when allowed to stand under sunlight and after 40 minutes when allowed to stand in the shade.

Barcol hardness measurement was performed on a cured product which had been allowed to stand for one hour under sunlight and a cured product which had been allowed to stand for six hours in the shade by use of a Barcol hardness tester (Type 934-1) according to JIS K-6911. The flexural strength of the product was also measured. The results are shown in Table 3.

Comparative Example 1

To 100 parts of vinyl ester resin R-802, there were added ISONATE 143L (diphenylmethane diisocyanate (MDI), product of Mitsubishi Dow Co. Ltd.) (4 parts), and Irgacure 1700 (1.0 part). One ply of a glass fiber #450 chopped strand mat (10 cm×10 cm) was impregnated with the thus-obtained photocurable resin composition so that the mat came to have a glass content of 30 wt %.

The composite material composition was coated with Mylar film and allowed to stand at 40° C. for 24 hours, to thereby obtain a B-staged product. The thus-obtained B-staged product was used as a representative prepreg sheet, and storage stability in the dark at 30° C. was investigated. A resin component flowed from the photocurable prepreg, with no curing experiment being possible.

Example 6

To 100 parts by weight of an unsaturated polyester resin (Rigolac 1557, product of Showa Highpolymer Co., Ltd.), there were added IRB (0.1 part), P3B (0.5 parts), Blm (0.1 part), and MBT (0.1 part). One ply of a glass fiber #450 chopped strand mat (10 cm×10 cm) was impregnated with the thus-obtained photocurable resin composition so that the mat came to have a glass content of 30 wt %.

The composite material composition was coated with Mylar film and irradiated with light from a 3 KW gallium lamp Unirec URM-300 (product of Ushio Inc.) from a distance of 100 cm with combined use of a filter for cutting wavelength 650 nm or more, Long-wavelength Cutting Series 650 nm (product of Asahi Bunko Co.) Three-minute irradiation successfully yielded a B-staged product. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated by use of 1 KW AL-spotlight (ALF-10) (from a distance of 50 cm). The laminate was completely cured after 10 minutes.

Barcol hardness measurement was performed on a product which was cured through irradiation with AL-spotlight for 20 minutes by use of a Barcol hardness tester (Type 934-1) according to JIS K-6911. The flexural strength of the product was also measured. The results are shown in Table 3.

Example 7

To 100 parts by weight of an unsaturated polyester resin (Rigolac 2141, product of Showa Highpolymer Co., Ltd.), there were added IRB (0.03 part), P3B (0.15 parts), Blm (0.3 parts), and MBT (0.6 parts). One ply of a glass fiber #450 chopped strand mat (10 cm×10 cm) was impregnated with the thus-obtained photocurable resin composition so that the mat came to have a glass content of 30 wt %.

The composite material composition was coated with Mylar film and irradiated with light from a 1 KW AL-spotlight (ALF-10), which is a light source featuring a wavelength range of 390 to 1200 nm, from a distance of 50 cm with combined use of a filter for cutting wavelength 600 nm or less, SC60. Five-minute irradiation successfully yielded a B-staged product. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated by use of a 3 KW gallium lamp Unirec URM-300 (from a distance of 100 cm). The laminate was completely cured after 3 minutes.

Barcol hardness measurement was performed on a product which was cured through irradiation with a 3 KW gallium lamp Unirec URM-300 (from a distance of 100 cm) for six minutes by use of a Barcol hardness tester (Type 934-1) according to JIS K-6911. The flexural strength of the product was also measured. The results are shown in Table 3.

Example 8

To 100 parts by weight of an unsaturated polyester resin (Rigolac 1557, product of Showa Highpolymer Co., Ltd.), there were added a visible light-absorbing dye shown in Table 2-3 (counter ion; chloride anion) (0.02 parts), P3B (0.15 parts), and Irgacure 1800 (1.0 part). One ply of a glass fiber #450 chopped strand mat (10 cm×10 cm) was impregnated with the thus-obtained photocurable resin composition so that the mat came to have a glass content of 30 wt %.

The composite material composition was coated with Mylar film and irradiated with light from a 1 KW AL-spotlight (ALF-10), which is a light source featuring a wavelength range of 390 to 1200 nm, from a distance of 50 cm with combined use of a filter for cutting wavelength 500 nm or less, SC50. Five-minute irradiation successfully yielded a B-staged product. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated by use of a 1 KW AL-spotlight (ALF-10) (from a distance of 50 cm). The laminate was completely cured after 10 minutes.

Barcol hardness measurement was performed on a product which was cured through irradiation with a 1 KW AL-spotlight (ALF-10) (from a distance of 50 cm) for 20 minutes by use of a Barcol hardness tester (Type 934-1) according to JIS K-6911. The flexural strength of the product was also measured. The results are shown in Table 3.

Example 9

To 100 parts by weight of an unsaturated polyester resin (Rigolac 2141, product of Showa Highpolymer Co., Ltd.), there were added a visible light-absorbing triarylmethane dye shown in Table 2-5 (counter ion; chloride anion) (0.03 parts), BP3B (0.3 parts), and Irgacure 1800 (1.0 part). One ply of a glass fiber #450 chopped strand mat (10 cm×10 cm) was impregnated with the thus-obtained photocurable resin composition so that the mat came to have a glass content of 30 wt %.

The composite material composition was coated with Mylar film and irradiated with light from a 1 KW AL-spotlight (ALF-10), which is a light source featuring a wavelength range of 390 to 1200 nm, from a distance of 50 cm with combined use of a filter for cutting wavelength 500 nm or less, SC50. Three-minute irradiation successfully yielded a B-staged product. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated by use of a 1 KW AL-spotlight (ALF-10) (from a distance of 50 cm). The laminate was completely cured after 10 minutes.

Barcol hardness measurement was performed on a product which was cured through irradiation with a 1 KW AL-spotlight (ALF-10) (from a distance of 50 cm) for 20 minutes by use of a Barcol hardness tester (Type 934-1) according to JIS K6911. The flexural strength of the product was also measured. The results are shown in Table 3.

Example 10

To 100 parts by weight of an unsaturated polyester resin (Rigolac 1557, product of Showa Highpolymer Co., Ltd.), there were added a visible light-absorbing triarylmethane dye shown in Table 2-9 (counter ion; tetraphenylborate anion) (0.02 parts), BP3B (0.2 parts), Blm (0.3 parts), and MBT (1.0 part). One ply of a glass fiber #450 chopped strand mat (10 cm×10 cm) was impregnated with the thus-obtained photocurable resin composition so that the mat came to have a glass content of 30 wt %.

The composite material composition was coated with Mylar film and irradiated with light from a 1 KW AL-spotlight (ALF-10), which is a light source featuring a wavelength range of 390 to 1200 nm, from a distance of 50 cm with combined use of a filter for cutting wavelength 500 nm or less, SC50. Three-minute irradiation successfully yielded a B-staged product. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated by use of a 1 KW AL-spotlight (ALF-10) (from a distance of 50 cm). The laminate was completely cured after 10 minutes.

Barcol hardness measurement was performed on a product which was cured through irradiation with a 1 KW AL-spotlight (ALF-10) (from a distance of 50 cm) for 20 minutes by use of a Barcol hardness tester (Type 934-1) according to JIS K-6911. The flexural strength of the product was also measured. The results are shown in Table 3.

Comparative Example 2

To 100 parts by weight of an unsaturated polyester resin (Rigolac 1557, product of Showa Highpolymer Co., Ltd.), there were added Magmic (magnesium oxide, product of Kyowa Kagaku Co.) (1 part) and Irgacure 1700 (1.0 part). One ply of a glass fiber #450 chopped strand mat (10 cm×10 cm) was impregnated with the thus-obtained photocurable resin composition so that the mat came to have a glass content of 30 wt %.

The composite material composition was coated with Mylar film and allowed to stand at 40° C. for 48 hours, to thereby obtain a B-staged product. The thus-obtained B-staged product was used as a representative prepreg sheet, and storage stability in the dark at 30° C. was investigated. A resin component flowed from the photocurable prepreg, and no curing experiment could be performed.

Example 11

To 100 parts of vinyl ester resin (trade name: Ripoxy R-808, product of Showa Highpolymer Co., Ltd.), there were added IRB (0.03 parts), P3B (0.15 parts), Blm (0.3 parts), MBT (1.0 part), and HIGILLITE HBT-320 (aluminum hydroxide, product of Showa Denko K.K.) (30 parts). One ply of a glass fiber #450 chopped strand mat (10 cm×10 cm) was impregnated with the thus-obtained photocurable resin composition so that the mat came to have a glass content of 30 wt %.

The composite material composition was coated with Mylar film and irradiated with light from a 1 KW AL-spotlight (ALF-10), which is a light source featuring a wavelength range of 390 to 1200 nm, from a distance of 50 cm with combined use of a filter for cutting wavelength 600 nm or less, SC60. Five-minute irradiation successfully yielded a B-staged product. The product remained B-staged after another 10-minute irradiation. The thus-obtained B-staged product was used as a representative prepreg sheet, and storage stability in the dark at 30° C. was investigated. After the prepolymerized prepreg was stored in the dark for two months at 30° C., the curability of the 3-ply laminate of the prepolymerized prepreg was investigated by use of a 250 W metal halide lamp (HQI-TS250W/D, product of Mitsubishi Electric Osuramu Corporation) and a lamp holder (HQI downlight QX038W, product of Mitsubishi Electric Lamp Corporation) (from a distance of 30 cm). The laminate was completely cured after 3 minutes.

Under the similar conditions, Barcol hardness measurement was performed on a product which was cured by irradiation for six minutes by use of a Barcol hardness tester (Type 934-1) according to JIS K-6911. The flexural strength of the product was also measured. The product was found to successfully attain a practical level as high as front/back= 40/39.

In summary, the present invention is directed to a stable photocurable prepreg composition which has excellent storage stability and in which polymerization of radical-polymerizable unsaturated groups contained in a photopolymerizable compound do not proceed during long-term storage, as well as to a production method therefor. According to the invention, there is accomplished stable B-staging of a portion of the radical-polymerizable unsaturated groups to realize stable thickening. The present invention provides a photocurable prepreg composition which has a high curing speed, which can reliably be formed into molded products having high hardness, and, in the cases of production of large-size molded products or outdoor building materials where heating is difficult or cannot be performed, which eliminates the need for heat sources.

B-staging of the photocurable compounds is performed by polymerizing radical-polymerizable unsaturated groups through use of only a portion of a plurality of the incorporated photopolymerization initiators having different absorption wavelengths. Therefore, stable polymerization is realized, to thereby prevent sagging in the formed prepreg induced by separation of monomers and to thereby obtain a prepreg composition having excellent storage stability.

The results obtained for the above Examples and Comparative Examples are set forth in Table 3 below.

TABLE 1

| | Example 1 | Example 2 | Example 3 |
|---|---|---|---|
| Resin | R-802 | H-630 | R-802 |
| Glass fiber | #450 chopped strand map 1 ply | | |
| B-staging agent | | | |
| Organo borate | P3B: 0.15 | P3B: 0.15 | P3B: 0.15 |
| Cationic dye (Anion moiety of the dye) | Table 1-3: 0.03 (n-butyltri-phenylborate) | Table 1-3: 0.03 (n-butyltri-phenylborate) | Table 2-4: 0.02 (chloride anion) |
| Initiator | Blm: 0.3 MBT: 1.0 | Irgacure 1700 : 1.0 | Irgacure 1800 : 1.0 |
| B-staging conditions | AL spotlight SC-60 filter 10 min irradiation | AL spotlight SC-60 filter 10 min irradiation | AL spotlight SC-50 filter 10 min irradiation |
| Storage stability of prepreg (30° C., dark, Mylar film-coated) | Normal for 2 months | Normal for 2 months | Normal for 2 months |
| Curing results of prepreg after 2 months storage | | | |
| Under sunlight | | | |
| Curing time | 10 min | 7 min | 7 min |
| Barcol hardness | 38/37 | 37/33 | 38/32 |
| flexural strength (Mpa) | 110 | 105 | 106 |
| flexural modulus (Gpa) | 7.7 | 7.4 | 7.5 |
| In the shade | | | |
| Curing time | 1 hr | 40 min | 40 min |
| Barcol hardness | 38/37 | 35/28 | 36/27 |
| flexural strength (Mpa) | 113 | 98 | 105 |
| flexural modulus (Gpa) | 8.4 | 7.1 | 7.4 |

| | Example 4 | Example 5 | Comparative Example 1 |
|---|---|---|---|
| Resin | H-630 | R-802 | R-802 |
| Glass fiber | #450 chopped strand map 1 ply | | |
| B-staging agent | | | |
| Organo borate | BP3B: 0.20 | BP3B: 0.20 | MDI: 4.0 |
| Cationic dye | Table 2-6: 0.02 | Table 2-7: 0.02 | |

TABLE 1-continued

|  | | | |
|---|---|---|---|
| (Anion moiety of the dye) | (tetraphenyl-borate) | (tetraphenyl-borate) | |
| Initiator | Irgacure 1800: 1.0 | Blm: 0.3<br>MBT: 1.0 | Irgacure 1700: 1.0 |
| B-staging conditions | AL spotlight SC-50 filter 5 min irradiation | AL spotlight SC-50 filter 5 min irradiation | Dark, 40° C. allowing to stand 24 hrs |
| Storage stability of prepreg (30° C., dark, Mylar film-coated) | Normal for 2 months | Normal for 2 months | Partial resin flow from prepreg after 1 week |
| Curing results of prepreg after 2 months storage | | | |
| Under sunlight | | | |
| Curing time | 7 min | 10 min | Not measurable flexural |
| Barcol hardness | 39/36 | 38/37 | |
| flexural strength (Mpa) | 112 | 107 | |
| flexural modulus (Gpa) | 8.0 | 7.7 | |
| In the shade | | | |
| Curing time | 40 min | 40 min | Not measurable |
| Barcol hardness | 36/33 | 36/32 | |
| flexural strength (Mpa) | 110 | 99 | |
| flexural modulus (Gpa) | 7.9 | 7.4 | |

|  | Example 6 | Example 7 | Example 8 |
|---|---|---|---|
| Resin | 1557 | 2141 | 1557 |
| Glass fiber | #450 chopped strand map 1 ply | | |
| B-staging agent | Blm: 0.1<br>MBT: 0.1 | P3B: 0.15<br>Table 1-3: 0.03 (anion moiety; n-butyltri-phenylborate) | P3B: 0.15<br>Table 2-3: 0.02 (anion moiety; chloride anion) |
| Initiator | P3B: 0.5<br>Table 1-3: 0.1 (anion moiety; n-butyltri-phenylborate) | Blm: 0.3<br>MBT: 0.6 | Irgacure 1800: 1.0 |
| B-staging conditions | Unirex URM-300 filter (≧650 mn cut) 3 min irradiation | AL spotlight SC-60 filter 5 min irradiation | AL spotlight SC-50 filter 5 min irradiation |
| Storage stability of prepreg (30° C., dark, Mylar film-coated) | Normal for 2 months | Normal for 2 months | Normal for 2 months |
| Curing results of prepreg after 2 months storage | | | |
| Lamp used | AL spotlight | Unirex URM-300 | AL spotlight |
| Curing time | 20 min | 6 min | 20 min |
| Barcol hardness | 35/35 | 36/34 | 36/33 |
| flexural strength (Mpa) | 103 | 100 | 104 |
| flexural modulus (Gpa) | 7.1 | 6.8 | 7.2 |

|  | Example 9 | Example 10 | Comparative Example 2 |
|---|---|---|---|
| Resin | 2141 | 1557 | 1157 |
| Glass fiber | #450 chopped strand map 1 ply | | |
| B-staging agent | BP3B: 0.30<br>Table 2-5: 0.03 (anion moiety; chloride anion) | BP3B: 0.20<br>Table 2-9: 0.02 (anion moiety; tetraphenyl-borate) | MgO: 1.0 |
| Initiator | Irgacure 1800: 1.0 | Blm: 0.3<br>MBT: 1.0 | Irgacure 1700: 1.0 |
| B-staging conditions | AL spotlight SC-50 filter 3 min irradiation | AL spotlight SC-50 filter 3 min irradiation | Dark, 40° C. allowed to stand 48 hrs |
| Storage stability of prepreg (30° C., dark, Mylar film-coated) | Normal for 2 months | Normal for 2 months | Partial resin flow flow from prepreg after 10 days |
| Curing results of prepreg after 2 months storage | | | |
| Lamp used | AL spotlight | AL spotlight | |
| Curing time | 20 min | 20 min | Not measurable |
| Barcol hardness | 35/34 | 36/34 | |
| flexural strength (Mpa) | 99 | 104 | |
| flexural modulus (Gpa) | 6.7 | 7.0 | |

Note) Barcol hardness meter (934-1): front/back

While the invention has been described in detail and with reference to specific embodiments thereof, it will be apparent to one skilled in the art that various changes and modifications can be made therein without departing from the spirit and scope thereof.

What is claimed is:

1. A photocurable prepreg composition obtained by a method comprising prepolymerizing by irradiating a composition which comprises:

an unsaturated polyester resin, an epoxy(meth)acrylate or a mixture thereof;

at least two photopolymerization initiators with photosensitivity in different wavelength ranges comprising (A) a photopolymerization initiator with photosensitivity in a visible range of wavelengths of 500 nm or more or in a near infrared range comprising (1) a cationic dye represented by formula (1):

$$D^+ \bullet A^- \quad (1)$$

wherein $D^+$ represents a dye cation with photosensitivity in a visible or a near infrared range and which is derived from a member selected from the group consisting of methine, polymethine, cyanine, xanthene, oxazine, thiazine, arylmethane, and pyrylium: and $A^-$ represents an anion and (2) an organo borate represented by formula (2):

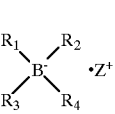

(2)

wherein $Z^+$ represents a cation; each $R_1$, $R_2$, $R_3$ and $R_4$ represents an alkyl group, an aryl group, an acyl group, an aralkyl group, an alkenyl group, an alkenyl group, a silyl group, a heterocyclic group, or a halogen atom; and (B) a photopolymerization initiator with photosensitivity in a visible range of wavelengths of less than 500 nm and/or in an ultraviolet range; and an inorganic or organic fiber reinforcing material, an inorganic or an organic filler or mixture thereof, and which composition is treated with light of a specific wavelength for at least one photoinitiator with photosensitivity to the specific wavelength such that at least one photopolymerization initiator and radical-polymerizable unsaturated groups remain partially in said resin.

2. A photocurable prepreg composition according to claim 1, wherein the cation moiety D⁺ of the photopolymerization initiator represented by formula (1) and with photosensitivity in a visible range of wavelengths of 500 nm or more or in near infrared range is a cyanine or a triarylmethane cationic dye.

3. A photocurable prepreg composition according to claim 2, wherein one of the photopolymerization initiators with photosensitivity in a visible range of wavelengths of less than 500 nm and/or an ultraviolet range comprises (1) an acylphosphine oxide compound or (2) a combination of a hexaarylbisimidazole compound and a hydrogen-donating compound.

4. A photocurable prepreg composition according to claim 1, wherein one of the photopolymerization initiators with photosensitivity in a visible range of wavelengths of less than 500 nm and/or an ultraviolet range comprises (1) an acylphosphine oxide compound or (2) a combination of a hexaarylbisimidazole compound and a hydrogen-donating compound.

5. A method for producing a photocurable prepreg composition comprising prepolymerizing by irradiating a composition which comprises an unsaturated polyester resin, an epoxy(meth)acrylate; or mixture thereof;

at least two photopolymerization initiators with photosensitivity in different wavelength ranges comprising (A) a photopolymerization initiator with photosensitivity in a visible range of wavelengths of 500 nm or more or in a near infrared range comprising (1) a cationic dye represented by formula (1):

wherein D⁺ represents a dye cation with photosensitivity in a visible or a near infrared range and which is derived from a member selected from the group consisting of methine, polymethine, cyanine, xanthene, oxazine, thiazine, arylmethane, and pyrylium: and A⁻ represents an anion and (2) an organo borate represented by formula (2):

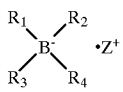

wherein Z⁺ represents a cation; each $R_1$, $R_2$, $R_3$ and $R_4$ represents an alkyl group, an aryl group, an acyl group, an aralkyl group, an alkenyl group, an alkynyl group, a silyl group, a heterocyclic group, or a halogen atom; and (B) a photopolymerization initiator with photosensitivity in a visible range of wavelengths of less than 500 nm and/or in an ultraviolet range; and an inorganic or organic fiber-reinforcing material, an inorganic or an organic filler or a mixture thereof, with visible light of a wavelength of 500 nm or more or with near infrared light.

6. A method for producing a cured product of a photocurable prepreg composition comprising prepolymerizing by irradiating a composition which comprises an unsaturated polyester resin, an epoxy(meth)acrylate; or mixture thereof;

at least two photopolymerization initiators with photosensitivity in different wavelength ranges comprising (A) a photopolymerization initiator with photosensitivity in a visible range of wavelengths of 500 nm or more or in a near infrared range comprising (1) a cationic dye represented by formula (1):

wherein D⁺ represents a dye cation with photosensitivity in a visible or a near infrared range and which is derived from a member selected from the group consisting of methine, polymethine, cyanine, xanthene, oxazine, thiazine, arylmethane, and pyrylium; and A⁻ represents an anion and (2) an organo borate represented by formula (2):

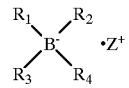

wherein Z⁺ represents a cation; each $R_1$, $R_2$, $R_3$ and $R_4$ represents an alkyl group, an aryl group, an acyl group, an aralkyl group, an alkenyl group, an alkynyl group, a silyl group, a heterocyclic group, or a halogen atom; and (B) a photopolymerization initiator with photosensitivity in a visible range of wavelengths of less than 500 nm and/or in an ultraviolet range; and an inorganic or organic fiber/reinforcing material, an inorganic or an organic filler or a mixture thereof; and which composition is treated with light of a specific wavelength for at least one photoinitiator with photosensitivity to the specific wavelength such that at least one photopolymerization initiator and radical-polymerizable unsaturated groups remain partially in said resin to produce a prepreg composition and irradiating the prepreg composition with light having a specific wavelength to which a photopolymerization initiator present in the prepreg composition is photosensitive.

7. A cured product of a photocurable prepreg composition which is obtained by installing or molding and irradiating a photocurable prepreg composition which comprises an unsaturated polyester resin, an epoxy(meth)acrylate; or mixture thereof;

at least two photopolymerization initiators with photosensitivity in different wavelength ranges comprising (A) a photopolymerization initiator with photosensitivity in a visible range of wavelengths of 500 nm or more or in a near infrared range comprising (1) a cationic dye represented by formula (1):

wherein D⁺ represents a dye cation with photosensitivity in a visible or a near infrared range and which is derived from a member selected from the group consisting of methine, polymethine, cyanine, xanthene, oxazine, thiazine, arylmethane, and pyrylium; and A⁻ represents an anion and (2) an organo borate represented by formula (2):

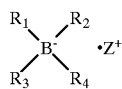 (2)

wherein $Z^+$ represents a cation; each $R_1$, $R_2$, $R_3$ and $R_4$ represents an alkyl group, an aryl group, an acyl group, an aralkyl group, an alkenyl group, an akynyl group, a silyl group, a heterocyclic group, or a halogen atom; and (B) a photopolymerization initiator with photosensitivity in a visible range of wavelengths of less than 500 nm and/or in an ultraviolet range; and an inorganic or organic fiber reinforcing material, an inorganic or an organic filler or a mixture thereof; and which composition is treated with light of a specific wavelength for at least one photoinitiator with photosensitivity to the specific wavelength such that at least one photopolymerization initiator and radical-polymerizable unsaturated groups remain partially in said resin, to produce a prepreg composition, which prepreg composition is irradiated with light having a specific wavelength to which a photopolymerization initiator present in the prepreg composition is photosensitive.

* * * * *